(12) United States Patent
Cherkaoui et al.

(10) Patent No.: US 6,905,739 B2
(45) Date of Patent: Jun. 14, 2005

(54) OPTICALLY ACTIVE MATERIALS

(75) Inventors: Zoubair Mohammed Cherkaoui, Allschwil (CH); Klaus Schmitt, Lörrach (DE)

(73) Assignee: Rolic AG, Zug (CH)

( * ) Notice: Subject to any disclaimer, the term of this patent is extended or adjusted under 35 U.S.C. 154(b) by 112 days.

(21) Appl. No.: 10/168,137

(22) PCT Filed: Dec. 20, 2000

(86) PCT No.: PCT/CH00/00673

§ 371 (c)(1),
(2), (4) Date: Jun. 20, 2002

(87) PCT Pub. No.: WO01/47862

PCT Pub. Date: Jul. 5, 2001

(65) Prior Publication Data

US 2003/0028048 A1 Feb. 6, 2003

(30) Foreign Application Priority Data

Dec. 23, 1999 (EP) .............................................. 9310561
Dec. 23, 1999 (GB) .............................................. 9930557

(51) Int. Cl.$^7$ ........................ C09K 19/52; C09K 19/32; C09K 19/30; C09K 19/34; C09K 19/20
(52) U.S. Cl. .............. 428/1.1; 252/299.61; 252/299.62; 252/299.63; 252/299.64; 252/299.66; 252/299.7; 252/299.01; 560/56; 560/61; 560/85; 560/100; 549/464
(58) Field of Search ...................... 428/1.1; 252/299.01, 252/299.61, 299.62, 299.63, 299.64, 299.66, 299.67, 299.7; 560/56, 61, 85, 100; 549/464

(56) References Cited

U.S. PATENT DOCUMENTS

| | | | |
|---|---|---|---|
| 5,567,349 A | | 10/1996 | Kelly et al. |
| 5,650,534 A | | 7/1997 | Kelly et al. |
| 5,700,393 A | | 12/1997 | Kelly |
| 5,707,544 A | * | 1/1998 | Kelly .................... 252/299.01 |
| 6,049,000 A | | 4/2000 | Strohriegl et al. |
| 6,060,042 A | * | 5/2000 | Schuhmacher et al. ....... 424/60 |
| 6,203,724 B1 | * | 3/2001 | Reiffenrath et al. .... 252/299.61 |
| 6,217,792 B1 | * | 4/2001 | Parri et al. ............. 252/299.61 |
| 6,630,076 B1 | * | 10/2003 | Cherkaoui et al. ..... 252/299.01 |
| 6,699,405 B2 | * | 3/2004 | Prechtl et al. ......... 252/299.64 |
| 6,723,395 B2 | * | 4/2004 | May et al. .................... 428/1.1 |
| 6,733,690 B1 | * | 5/2004 | Lukac et al. ........... 252/299.67 |
| 6,746,729 B1 | * | 6/2004 | Cherkaoui et al. .......... 428/1.1 |
| 6,749,771 B1 | * | 6/2004 | Cherkaoui et al. ..... 252/299.01 |
| 6,773,766 B2 | * | 8/2004 | Meyer et al. ................ 428/1.1 |
| 6,793,986 B2 | * | 9/2004 | Prechtl et al. ............... 428/1.1 |

FOREIGN PATENT DOCUMENTS

| | | |
|---|---|---|
| EP | 0 675 186 | 10/1995 |
| EP | 0 699 731 | 3/1996 |
| EP | 0 755 915 | 1/1997 |
| EP | 0 837 054 | 4/1998 |
| GB | 2330139 | * 4/1999 |
| WO | WO 99/64383 | 12/1999 |
| WO | WO 00/07975 | 2/2000 |

* cited by examiner

*Primary Examiner*—Shean C. Wu
(74) *Attorney, Agent, or Firm*—Finnegan, Henderson, Farabow, Garrett, & Dunner, L.L.P.

(57) ABSTRACT

A compound is of formula (I), in which: $A^1$ to $A^4$, $E^1$ and $E^2$ each independently represent hydrogen or an optionally-substituted hydrocarbon group; $B^1$ and $B^2$ each independently represent a single bond, an oxygen atom or an optionally-substituted hydrocarbon group; $MG^1$ and $MG^2$ each independently represent an optionally-substituted ring system; CG is a divalent or polyvalent chiral group. The optically active compound may be used as a doping agent for liquid crystals for a wide range of applications including solid state cholesteric filters for projection displays, circular polarisers, optical filters, etc.

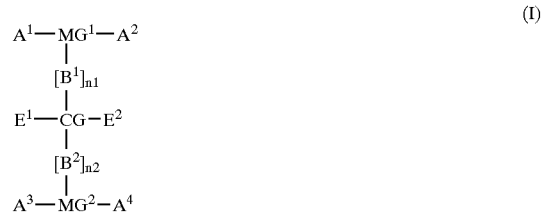

(I)

30 Claims, No Drawings

OPTICALLY ACTIVE MATERIALS

This application is a national stage filing under 35 U.S.C. § 371 of international application no. PCT/CH00/00673, filed on Dec. 20, 2000. This application claims the benefit of priority under 35 U.S.C. § 119(a) to GB patent application no. 9930557.5, filed on Dec. 23, 1999 and EP patent application no. 99310561.8, filed on Dec. 23, 1999.

This invention relates to optically active materials and their use as doping agents for liquid crystals for a wide range of applications including solid state cholesteric filters for projection displays, circular polarisers, optical filters, etc.

The addition of an optically-active compound to a non-optically-active liquid crystalline phase is one of procedures used for the conversion of non-optically-active into optically-active mesophases. The nematic phase, for example, is converted to the cholesteric one when being doped with a small amount of an optically-active substance. This conversion manifests itself by the occurrence of an intermolecular helix which is characterised by the so-called helical twisting power (HTP) given in Equation 1:

$$HTP = \left|\frac{dp^{-1}}{dx}\right|_{x=0} \cong \frac{p^{-1}}{x} = \sum_i x_i (HTP)_i \qquad (1)$$

HTP($\mu$m$^{-1}$) helical twisting power for small concentrations p($\mu$m) pitch of induced helix, + for (P)-helix, − for (M)-helix x mole fraction of the dopant $_i$ sum over all optically-active conformers of the dopant $x_i$ mole fraction of conformer i Said HTP is in fact a measure for the efficiency of a given dopant and is determined by the Cano method with solutions of the dopant in the host mesophase. Since the optically-active guest and the non-optically-active host compounds are not necessarily compatible at the molecular scale, their binary solution is frequently characterised by undesirable changes of the thermotropic sequence of the initial host liquid crystalline material, like for example a depression of the clearing point. Those changes could in turn have negative effects on the phase properties of the host, such as a decrease of the birefringence etc. Therefore, an optically-active dopant is sought so that with very small concentrations of this latter, large values of HTP could be induced.

As such efficient optically-active dopants there are the binaphthol derivatives described in GB-A-2 298 202. However optically-active binaphthol derivatives may undergo partial racemisation when being heated. Besides, their preparation is expensive because it includes asymmetric resolution of binaphthol racemate as a crucial reaction step.

Other classes of optically active dopants which are of easier chemical access than binaphthol derivatives are those described in U.S. Pat. No. 5,780,629, which are consisting of compounds having at least one divalent or polyvalent chiral group and at least one mesogenic group. Based on this molecular architecture, in which the chiral group is present at peripheral position of the mesogenic cores, we have prepared some chiral dimesogenic derivatives. Nevertheless, their use as doping agents for liquid crystals has only provided mixtures with a relatively small HTP. However, we have now discovered that a further class of compounds, including within its scope compounds that exhibit a chiral group at lateral position is of at least two rod-like shaped organic residues, is efficient for producing a large HTP. Besides, their synthesis is trivial and inexpensive since they are obtained in few reaction steps starting from commercially available optically active residues.

Thus, the invention provides chiral "sandwich" derivatives of formula I:

in which

A$^1$ to A$^4$ each independently represent hydrogen; an optionally-substituted methyl group; or an optionally-substituted hydrocarbon group of 2 to 80 C-atoms, in which one or more C-atoms may be replaced by a heteroatom, in such a way that oxygen atoms are not linked to one another;

E$^1$ and E$^2$ each independently represent hydrogen; an optionally-substituted methyl group; or an optionally-substituted hydrocarbon group of 2 to 80 C-atoms, in which one or more C-atoms may be replaced by a heteroatom, in such a way that oxygen atoms are not linked to one another;

B$^1$ and B$^2$ each independently represent a single bond, an oxygen atom or an optionally-substituted hydrocarbon group of 1 to 80 C-atoms, in which one or more C-atoms may be replaced by a heteroatom, in such a way that oxygen atoms are not linked to one another;

MG$^1$ and MG$^2$ each independently represent an optionally-substituted aromatic or non-aromatic carbocyclic or heterocyclic rings system, with 1 to 80 C-atoms;

CG is a divalent or polyvalent chiral croup derived, in particular, from sugars; from optically active biaryls such as optionally substituted binaphthyl or optionally substituted biphenyl; or from bifunctional or polyfunctional compounds such as optically active alcohols, glycols or amino acids; and n1 and n2 are each independently 1 or 2, where "n1=2" (or "n2=2") indicates the presence of two separate linkages via the groups B$^1$ (or the groups B$^2$) between the groups MG$^1$ and CG (or CG and MG$^2$);

and in which further the substructures A$^1$-MG$^1$-A$^2$ and A$^3$-MG$^2$-A$^4$ each have a longitudinal axis and are linked lateral to the said longitudinal axis to B$^1$ and B$^2$, respectively.

One possibility to form a longitudinal axis in the substructures A$^1$-MG$^1$-A$^2$ and A$^3$-MG$^2$-A$^4$ are compounds where two or more rings or a fused ring system are present in MG$^1$ or MG$^2$. Another possibility are compounds where at least one of A$^1$ or A$^2$ and A$^3$ or A$^4$ is different from hydrogen.

The compounds of the present invention are efficient for producing a large HTP.

Their synthesis is trivial and inexpensive since they are obtained in few reaction steps starting from commercially available optically active residues.

They are compatible with liquid-crystalline compounds or liquid-crystalline mixtures (no significant change of the clearing temperatures when used as dopants in a liquid-crystalline matrix).

They induce a large supercooling effect at the liquid-crystalline state when used as dopants in liquid-crystalline matrix hence avoiding crystallisation problems during the manufacture of cholesteric films.

They may be used as doping agents for liquid crystals for a wide range of applications including solid state cholesteric filters for projection displays, circular polarisers, optical filters, etc.

Preferred compounds of the present invention are those belonging to formula (I), in which:

n1=n2=1.

Preferably at least one of $A^1$ to $A^4$, $E^1$ and $E^2$ includes a polymerisable group, and each independently may be selected from formula (II):

$$P\text{-}(Sp^1)_{k1}\text{-}(X')_{t1}\text{-} \qquad (II)$$

wherein:

P is hydrogen or a polymerisable group selected from groups comprising $CH_2=CW-$, $CH_2=CW-O-$, $CH_2=CW-COO-$, $CH_2=C(Ph)\text{-}COO-$, $CH_2CH-COO\text{-}Ph\text{-}$, $CH_2CW-CO-NH-$, $CH_2=C(Ph)\text{-}CONH-$, $CH_2=C(COOR')-CH_2-COO-$, $CH_2=CH-O-$, $CH_2=CH-OOC-$, $(Ph)-CH=CH-$, $CH_3CH=N-(CH_2)_{m3}$, $HO-$, $HS-$, $HO-(CH_2)_{m3}-$, $HS-(CH_2)_{m3}-$, $HO(CH_2)_{m3}COO-$, $HS(CH_2)_{m3}COO-$, $HWN-$, $HOC(O)-$, $CH_2=CH\text{-}Ph\text{-}(O)_{m4}$,

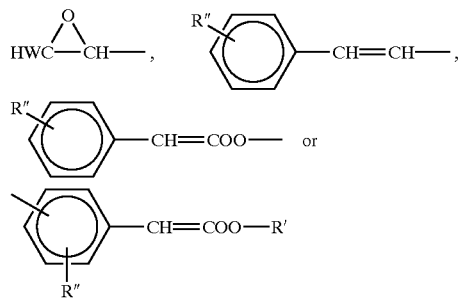

wherein:
W represents H, F, Cl, Br or I or a $C_{1\text{-}5}$ alkyl group;
m3 is an integer having a value of from 1 to 9;
m4 is an integer having a value of 0 or 1,
R' represents a $C_{1\text{-}5}$ alkyl group; and
R" represents a $C_{1\text{-}5}$ alkyl group, methoxy, cyano, F, Cl, Br or I;
$Sp^1$ represents an optionally-substituted $C_{1\text{-}20}$ alkylene group, in which one or more C-atoms may be replaced by a heteroatom;
$k^1$ is an integer having a value of from 0 to 4;
$X^1$ represents $-O-$, $-S-$, $-NH-$, $N(CH_3)-$, $-CH_2(OH)-$, $-CO-$, $-CH(CO)-$, $-SO-$, $-CH_2(SO)-$, $-SO_2-$, $-CH_2(SO_2)-$, $-COO-$, $-OCO-$, $-OCO-O-$, $-S-CO-$, $-CO-S-$, $-SOO-$, $-OSO-$, $-SOS-$, $-CH_2-CH_2-$, $-OCH_2-$, $-CH_2O-$, $-CH=CH-$, or $-C\equiv C-$; and
$t^1$ is an integer having a value of 0 or 1.

In relation to the residue of formula (II), the term Ph is to be understood as denoting phenylene and (Ph) as denoting phenyl.

The $C_{1\text{-}20}$ alkylene group $Sp^1$ may comprise branched or straight chain alkylene groups and may be unsubstituted, mono- or polysubstituted by F, Cl, Br, I or CN. Alternatively or in addition one or more of $CH_2$ groups present in the hydrocarbon chain may be replaced, independently, by one or more groups selected from $-O-$, $-S-$, $-NH-$, $N(CH_3)-$, $-CH(OH)-$, $-CO-$, $-CH_2(CO)-$, $-SO-$, $-CH_2(SO)-$, $-SO_2-$, $-CH_2(SO_2)-$, $-COO-$, $-OCO-$, $-OCO-O-$, $-S-CO-$, $-CO-S-$, $-SOO-$, $-OSO-$, $-SOS-$, $-C\equiv C-$, $-(CF_2)_r-$, $-(CD_2)_s-$ or $C(W^1)=C(W^2)-$, with the proviso that no two oxygen atoms are directly linked to each other. $W^1$ and $W^2$ each represent, independently, H, $H-(CH_2)_{q1}-$ or Cl. The integers r, s and q1 each independently represent a number of between 1 and 15.

More preferably, $A^1$ to $A^4$ and $E^1$ to $E^2$ each independently represent a group of formula (III):

$$P^2\text{-}Sp^5\text{-}X^4- \qquad (III)$$

wherein:

$P^2$ represents hydrogen, $CH_2=CW^5-$ or $CH_2=CW^5-(CO)_{v2}O-$,

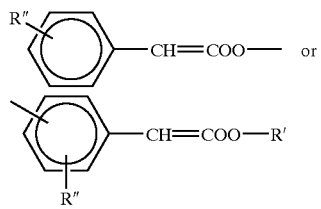

wherein:
$W^5$ represents H, $CH_3$, F, Cl, Br or I; and
v2 is 0 or 1,
R' represents a $C_{1\text{-}5}$ alkyl group; and
R" represents a $C_{1\text{-}5}$ alkyl group, methoxy, cyano, F, Cl, Br or I;
$Sp^5$ represents a $C_{1\text{-}20}$ straight-chain alkylene group, especially ethylene, propylene, butylene, pentylene, hexylene, heptylene, octylene, nonylene, decylene, undecylene, or dodecylene; and
$X^4$ represents $-O-$, $-CO-$, $-COO-$, $-OCO-$, $-C\equiv C-$, or a single bond, especially $-O-$, $-COO-$, $-OCO-$ or single bond.

One or more of $A^1$ to $A^4$ and $E^1$ to $E^2$ may also represent a $C_1\text{-}C_{20}$-alkyl, $C_1\text{-}C_{20}$-alkoxy, $C_1\text{-}C_{20}$-alkoxycarbonyl, $C_1\text{-}C_{20}$-alkylcarbonyl or $C_1\text{-}C_{20}$-alkylcarbonyloxy group, for example methyl, ethyl, propyl, butyl, pentyl, hexyl, heptyl, octyl, nonyl, decyl, undecyl, dodecyl, methoxy, ethoxy, n-propoxy, isopropoxy, butoxy, pentyloxy, hexyloxy, heptyloxy, octyloxy, nonyloxy, decyloxy, undecyloxy, dodecyloxy, methoxycarbonyl, ethoxycarbonyl, propoxycarbonyl, butoxycarbonyl, pentyloxycarbonyl, hexyloxycarbonyl, octyloxycarbonyl, nonyloxycarbonyl, decyloxycarbonyl, undecyloxycarbonyl, dodecyloxycarbonyl, acetyl, propionyl, butyryl, valeryl, hexanoyl, heptanoyl, octanoyl, nonanoyl, decanoyl, undecanoyl, dodecanoyl, terdecanoyl, acetoxy, propionyloxy, butyryloxy, valeryloxy, hexanoyloxy, heptanoyloxy, octanoyloxy, nonanoyloxy, decanoyloxy, undecanoyloxy, dodecanoyloxy, terdecanoyloxy and the like.

In a second preferred embodiment of the present invention each or either of the groups $B^1$ and/or $B^2$ comprises a group of formula (IV):

$$(X^2)_{t2}\text{-}(Sp^2)_{k2}\text{-}(X^3)_{t3} \qquad (IV)$$

wherein:

$Sp^2$ represents a $C_{1-20}$ alkylene group;

$X^2$ and $X^3$ each independently represent —O—, —S—, —NH—, $N(CH_3)$—, —CH(OH)—, —CO—, —$CH_2$(CO)—, —SO—, —$CH_2$(SO)—, —$SO_2$—, —$CH_2$($SO_2$)—, —COO—, —OCO—, —OCO—O—, —S—CO—, —CO—S—, —SOO—, —OSO—, —SOS—, —$CH_2$—$CH_2$—, —$OCH_2$—, —$CH_2$O—, —CH=CH—, —C≡C— or a single bond;

$k^2$ is an integer, having a value of 0 or 1; and $t^2$ and $t^3$ are integers, each independently having a value of 0 or 1;

with the proviso that oxygen atoms are not linked one to another.

Preferably $B^1$ and $B^2$ each independently represent a group of formula (IV), wherein:

$X^2$ to $X^3$ each independently represent —O—, —CO—, —COO—, —OCO—, —C≡C—, or a single bond, especially —O—, —COO—, —OCO— or a single bond; and $Sp^2$ represents a $C_{1-20}$ straight-chain alkylene group, especially ethylene. propylene, butylene, pentylene, hexylene, heptylene, octylene, nonylene. decylene, undecylene or dodecylene.

Especially preferred compounds are those in which $B^1$ and $B^2$ each independently represent a group of formula (IV) and $A^1$ to $A^4$ and $E^1$ to $E^2$ each independently represent a group of formula (III).

The invention is particularly useful when the groups of $MG^1$ and $MG^2$ have a mesogenic architecture so that compounds of formula (I) are able to be compatible with a host liquid-crystalline single compound or mixture. Thus preferably at least one of $MG^1$ and $MG^2$ represents a mesogenic group comprising at least two optionally-substituted aromatic or non-aromatic carbocyclic or heterocyclic ring systems.

Preferably one or more of $MG^1$ and $MG^2$ represents a mesogenic group comprising 1 to 4 aromatic or non-aromatic carbocyclic or heterocyclic ring systems and optionally up to 3 bridging groups. These are more preferably selected from the meanings of formulae (V):

$$C^1-(Z^1-C^2)_{a1}-(Z^2-C^3)_{a2}-(Z^3-C^4)_{a3} \qquad (V)$$

in which:

$C^1$ to $C^4$ are in each case independently optionally-substituted non-aromatic, aromatic, carbocyclic or heterocyclic groups;

$Z^1$ to $Z^3$ are independently from each other —COO—, —OCO—, —$CH_2$—$CH_2$—, —$OCH_2$—, —$CH_2$O—, —CH=CH—, —C≡C—, —CH=CH—COO—, —OCO—CH=CH— or a single bond; and a1, a2 and a3 are independently integers 0 to 3, such that a1+a2+a3 ≦ 3.

Especially preferred are those in which $C^1$ to $C^4$ are selected from:

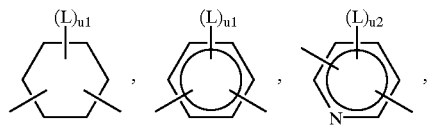

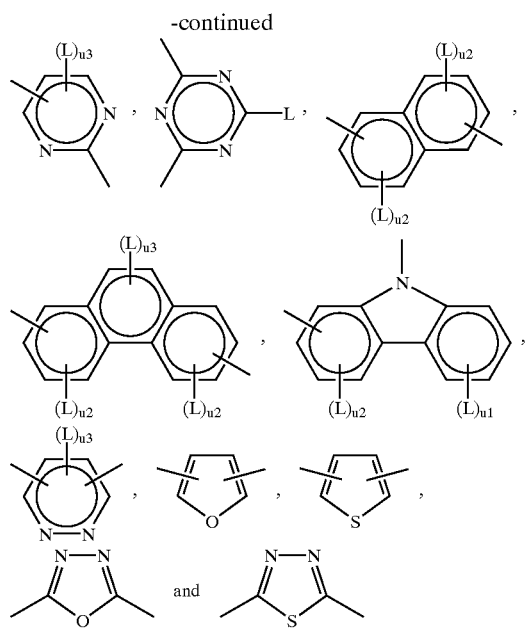

with:

L being —$CH_3$, —$COCH_3$, —$NO_2$, —CN, or halogen u1 being 0, 1, 2, 3, or 4, u2 being 0, 1, 2, or 3, and u3 being 0, 1, or 2.

More especially preferred are those in which $C^1$ to $C^4$ are selected from optionally-substituted cyclohexyl or cyclohexylene, phenyl or phenylene, naphthyl or naphthylene or phenanthryl or phenanthrylene.

For ease of synthesis, the molecules of formula (I) may possess some symmetrical aspects. These include the following possibilities:

n1=n2=1;

$A^1$ to $A^4$ are identical;

$E^1$ and $E^2$ are identical;

$MG^1$ and $MG^2$ are identical;

CG is a chiral group having at least two chiral centres more preferably two adjacent chiral centres; or $B^1$ and $B^2$ are identical and both consisting of single bonds, oxygen atoms or an optionally-substituted hydrocarbon group of 1 to 3-C atoms.

Other aspects of the present invention are a) a liquid crystalline material, especially in the form of a liquid crystalline mixture, (co)polymer, elastomer, polymer gel or polymer network, comprising at least two components, at least one of which is a chiral compound, characterised in that the chiral compound is a sandwich derivative of formula (I);

b) a liquid crystalline material, especially in the form of a cholesteric mixture, or cholesteric polymer network, comprising at least two components, at least one of which is a chiral compound, characterised in that the chiral compound is a sandwich derivative of formula (I);

c) a cholesteric polymer network obtainable by copolymerisation of an optically active polymerisable mesogenic mixture comprising:

i) at least one chiral or/and achiral nematic polymerisable mixture chosen from the already reported broad range of chiral and achiral nematic materials, for example as in Adv. Mater. 5, 107 (1993), Mol. Cryst. Liq. Cryst. 307, 111 (1997), J. Mat. Chem. 5, 2047 (1995) or in patent publications U.S. Pat. No. 5,593,617; U.S. Pat.

No. 5,567,349; GB-A-2297556; GB-A-2299333; DE-A-19504224; EP-A-0606940; EP-A-0643121 and EP-A-0606939, optionally selected from EP-A-0606940; EP-A-0643121 and EP-A-0606939;
  ii) at least one chiral dopant of formula (I);
  iii) an initiator;
  iv) optionally a non-mesogenic compound having at least one polymerisable functional group, more optionally a diacrylate compound; and
  v) optionally a stabiliser;
d) chiral polymerisable cholesteric mixtures, essentially consisting of:
  i) 70 to 99%, preferably 85 to 95% by weight of at least one achiral polymerisable liquid crystal;
  ii) 0.1 to 30%, preferably 1 to 15% by weight of a chiral compound of formula I;
  iii) 0.1 to 5%, preferably 0.2 to 2% by weight of a photoinitiator; and
  iv) 0 to 5%, preferably 0.1 to 1% of a stabiliser; and
e) a cholesteric film obtainable by the steps comprising ordering the above mixture in the monomeric state and in situ UV polymerisation of the resulting ordered mixture.

The invention also includes:
a) the use of the compounds as dopants for liquid crystals;
b) the use of the compounds or liquid crystalline materials for manufacturing a polymeric cholesteric layer; and
c) the use of the cholesteric polymer network, chiral polymerisable cholesteric mixtures, or cholesteric film, in optical components such as optical filters and polarisers, and especially colour filters, optical pass band filters, solid state cholesteric filters for projection displays and circular polarisers.

The compounds of the invention may be readily prepared using methods that are well known to the person skilled in the art, such as those documented in Houben-Weyl, *Methoden der Organischen Chemie*, Thieme-Verlag, Stuttgart. The compounds may for example be made according to the following reaction schemes:

Scheme 1:

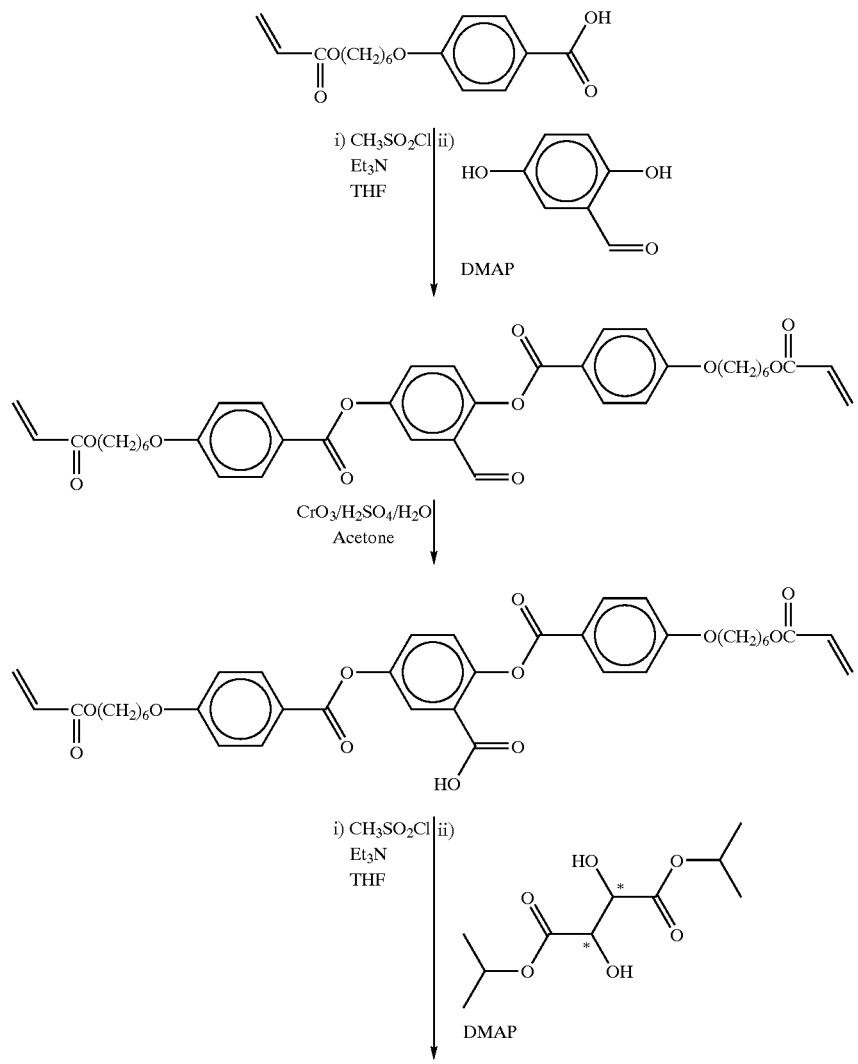

-continued
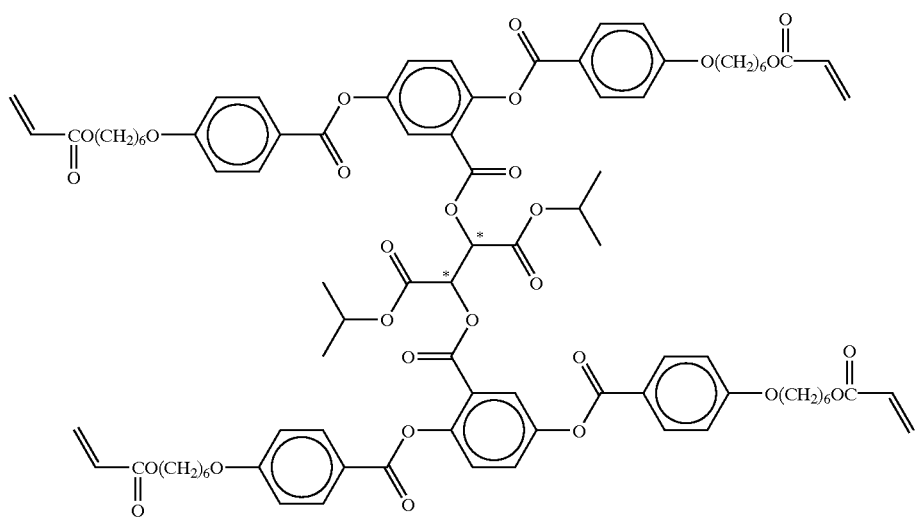
Scheme 2:
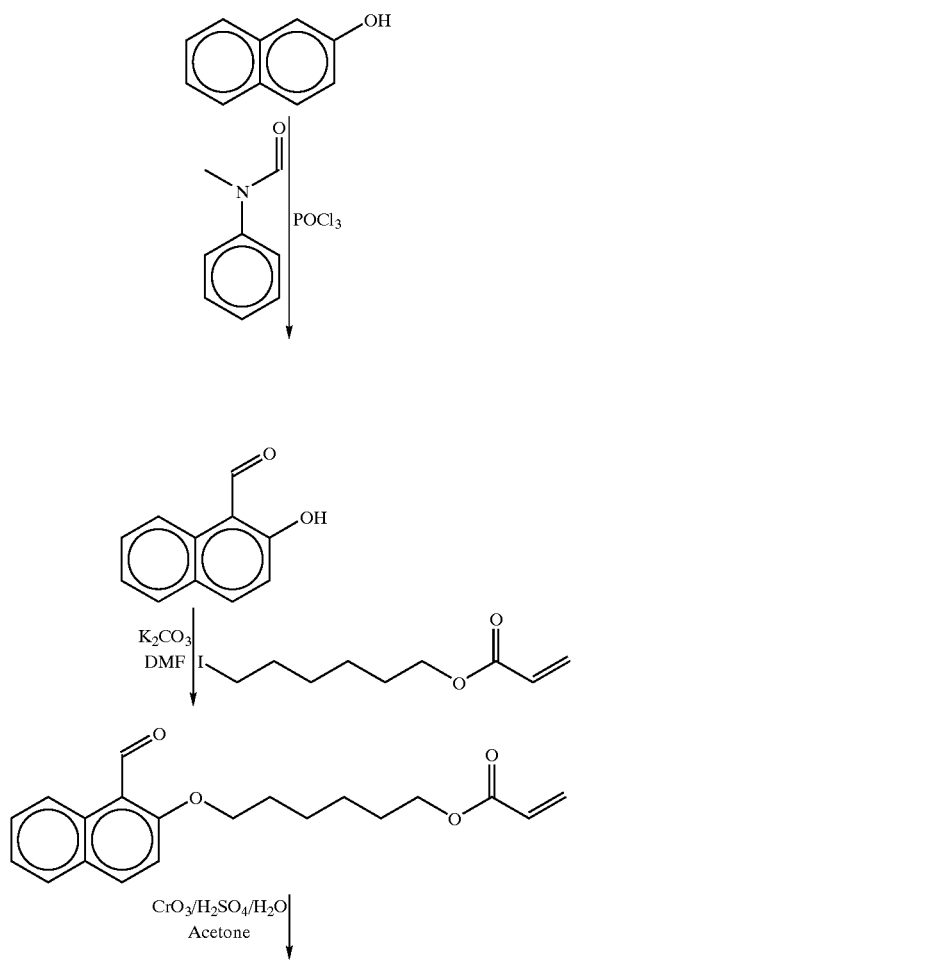

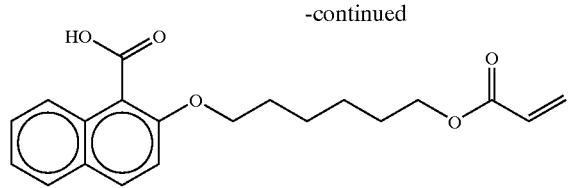
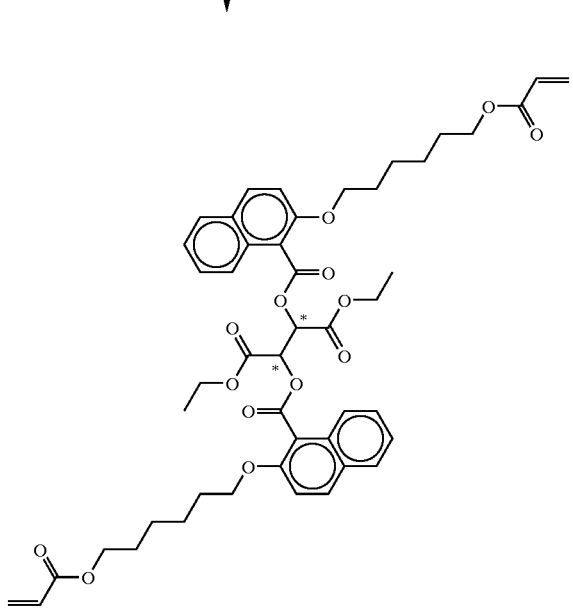
Scheme 3:
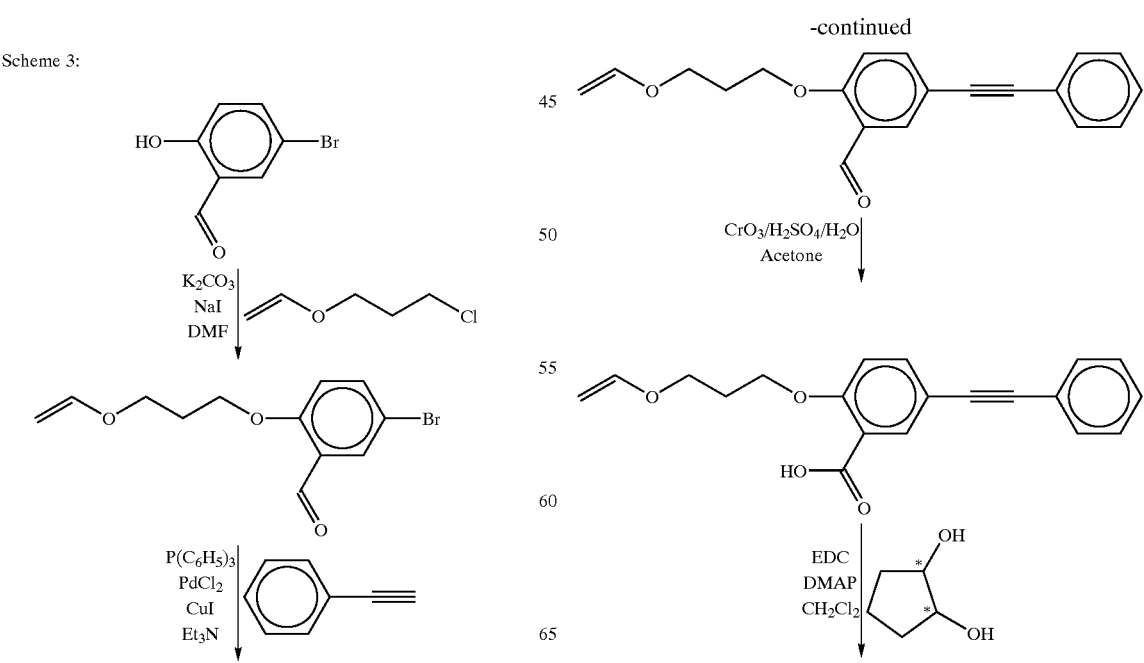

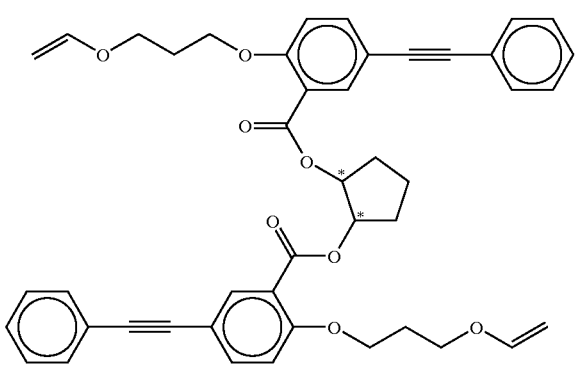

EDC: N-(3-Dimethylaminopropyl)-N'-ethylcarbodiimide hydrochloride, DMAP: N,N-Dimethylaminopyridine; DMF: N,N-Dimethylformamide According to the synthetic ways drawn in Schemes 1–3 typical examples representing polymerisable chiral "sandwich" derivatives shown in the following list of compounds are prepared. This list is, however, to be understood only as illustrative without limiting the scope of the present invention:

E. 1

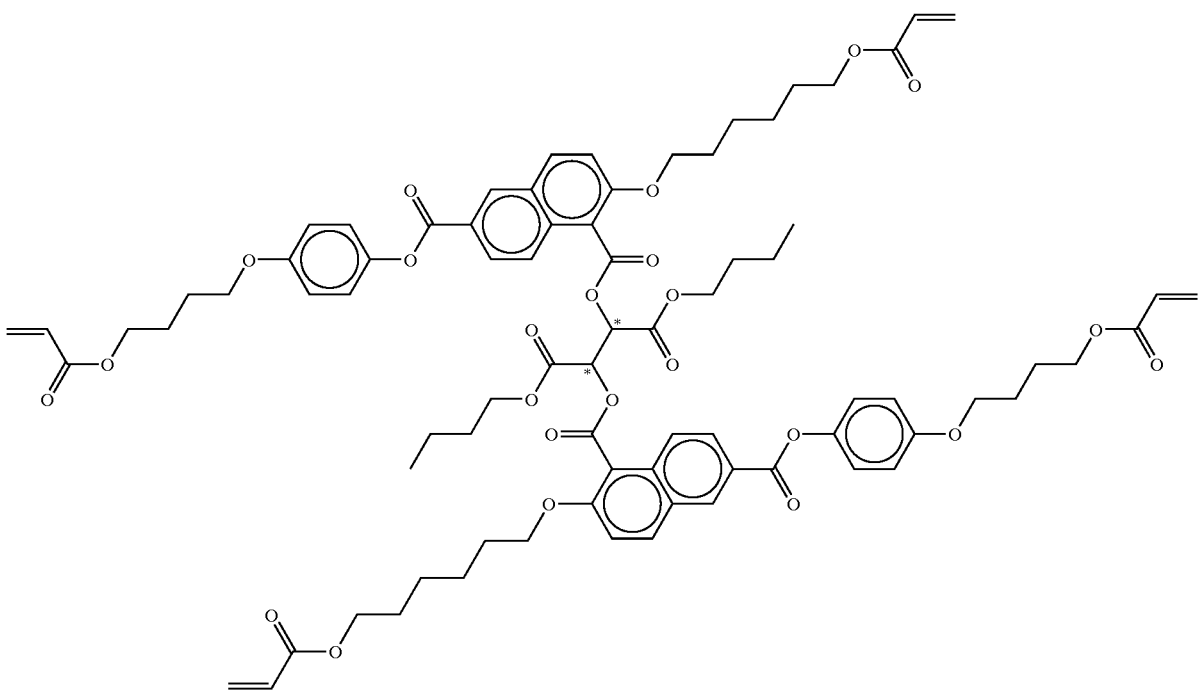

E. 2

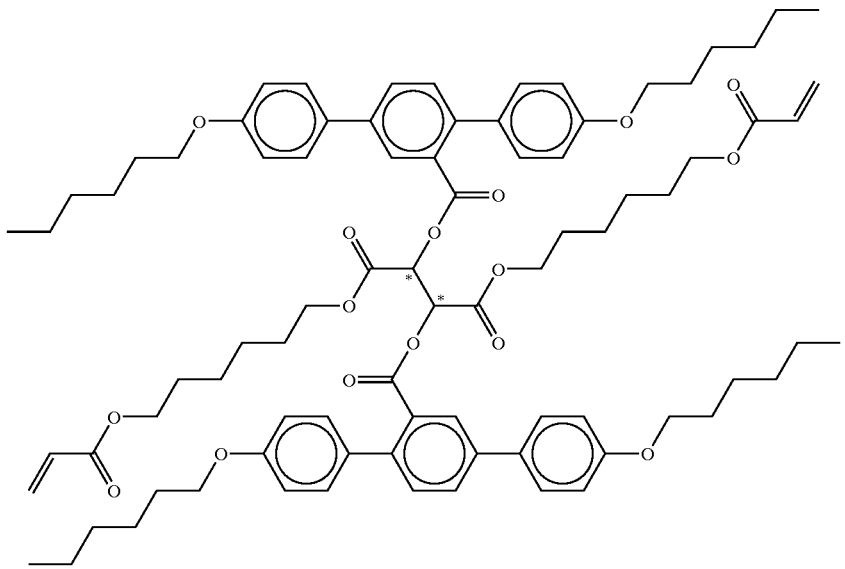

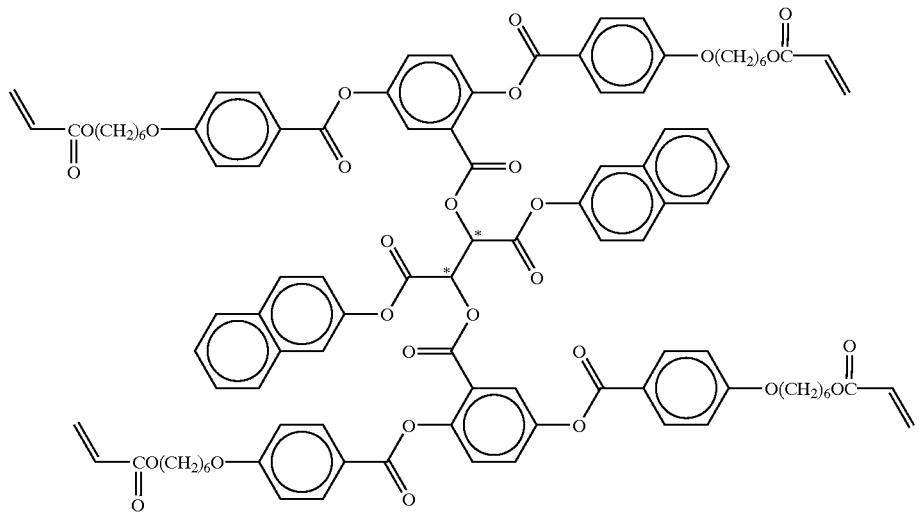
E. 3
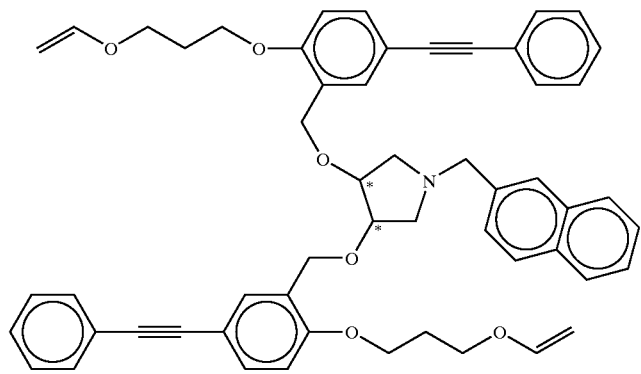
E. 4
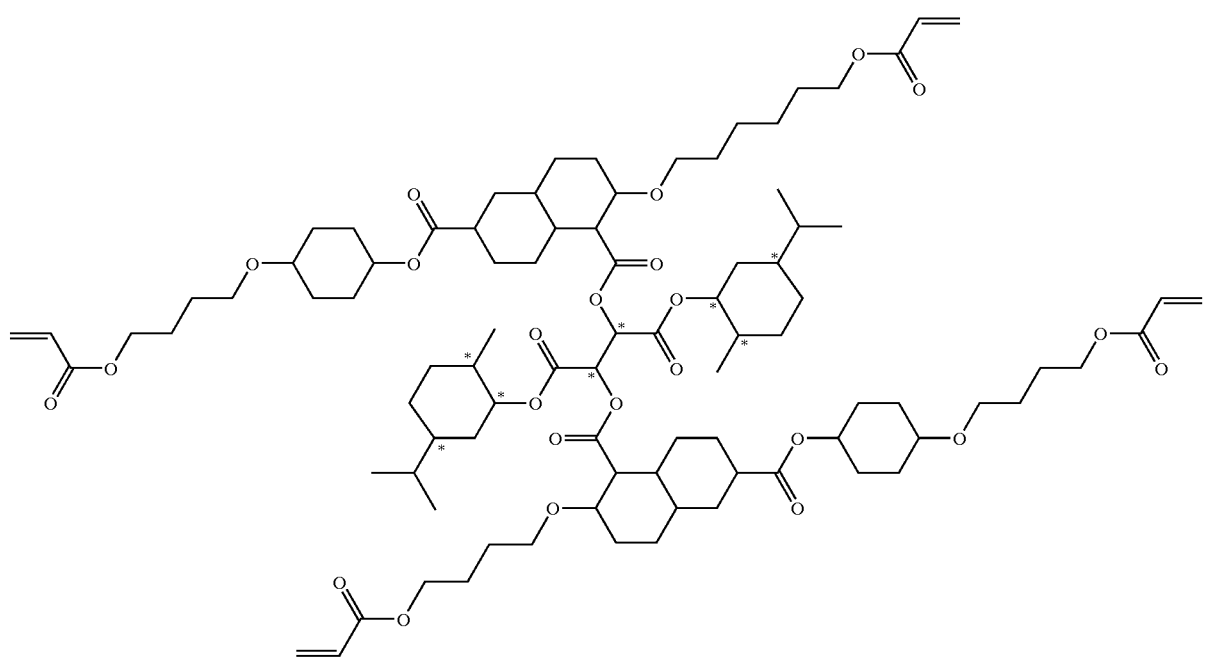
E. 5

-continued
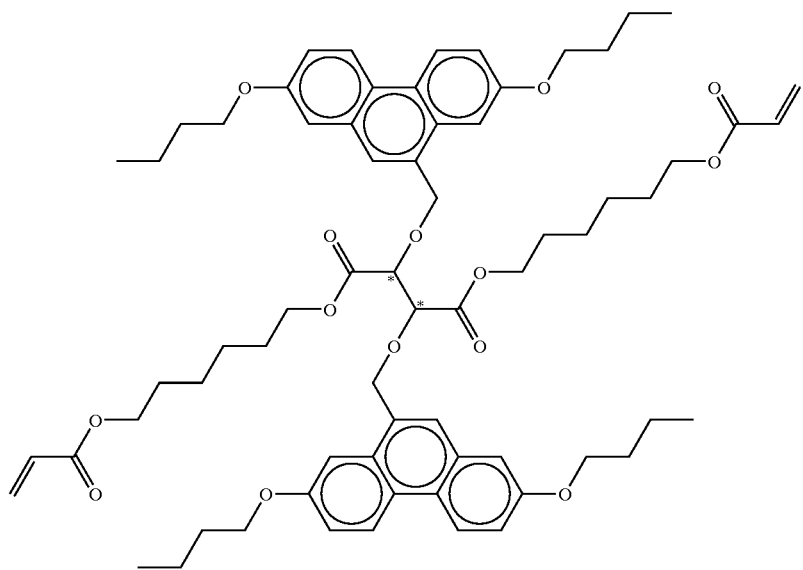
E. 6
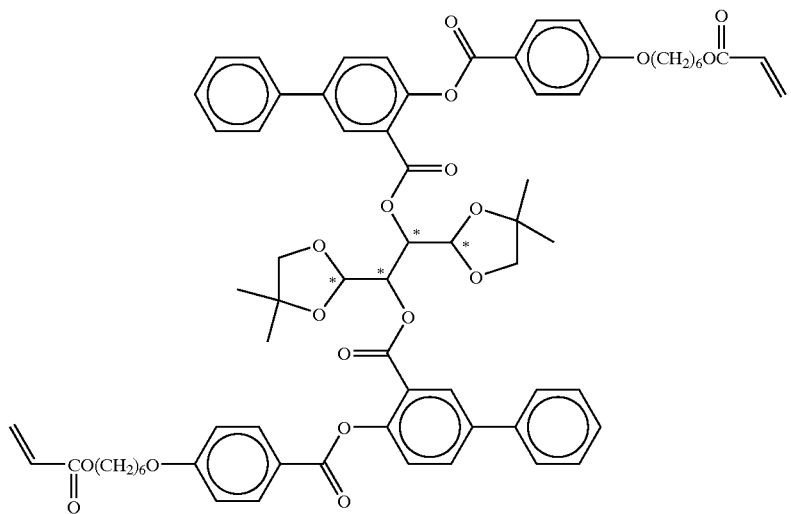
E. 7
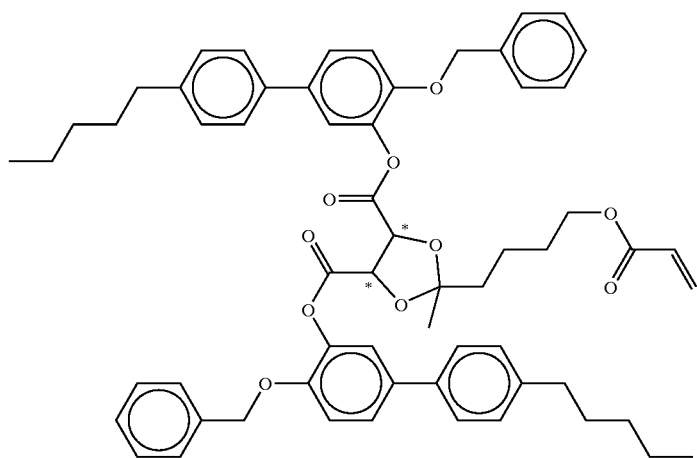
E. 8

E. 9

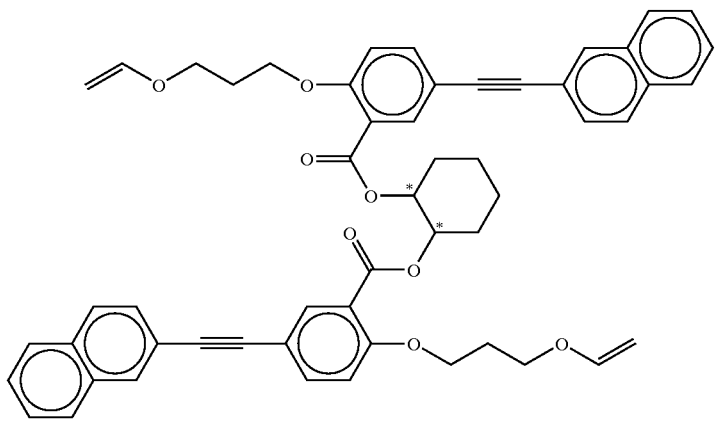

EXAMPLE 1

Diisopropyl L-2,3-bis-{2,5-bis-[4-(6-acryloyloxyhexyloxy)benzoyloxy]benzoyloxy}-succinate

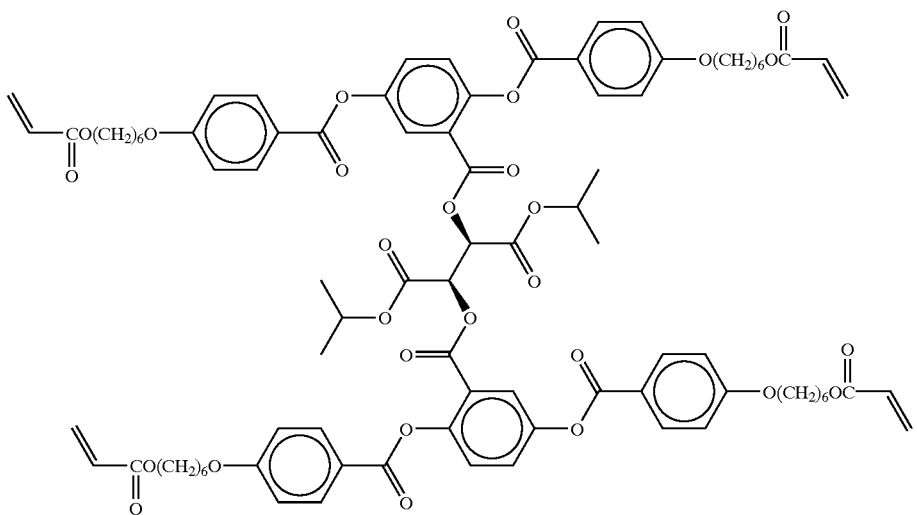

a) 2,5-Di-[-4-(6-acryloyloxyhexyloxy)benzoyloxy]benzaldehyde

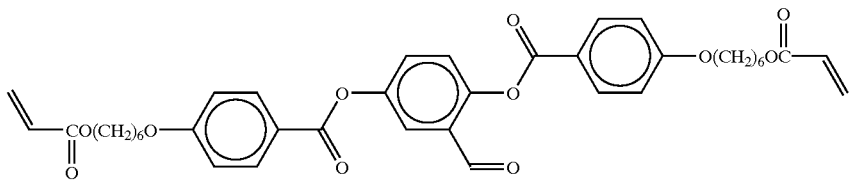

A solution of mesyl chloride (4.23 g, 36.94 mmol) in 10 ml of dry THF was added dropwise under argon over a period of 15 minutes to a cooled (−25° C.) solution of 4-(6-acryloyloxyhexyloxy)benzoic acid and triethylamine (20 ml) in 80 ml of dry THF. The reaction mixture was then stirred for 60 min at −25° C., treated with a solution of 2,5-dihydroxybenzaldehyde (2.3 g, 16.65 mmol) in 60 ml of dry THF containing 195 mg of DMAP and further stirred at −25° C. for 2 h. The reaction mixture was then allowed to warm to room temperature and stirring was continued overnight. The reaction mixture was then poured into 120 ml of saturated $NaHCO_3$ and extracted with 2×200 ml of ether. The combined organic extracts were washed with 3N HCl (200 ml) and semi-saturated NaCl solution (2×100 ml), dried over $MASO_4$, filtered and dried to give a slightly yellow pasty material. This was purified by flash chromatography over a short silica column ($CH_2Cl_2/Et_2O$ : 19.5/0.5) to give a white residue (9.25 g) which was dissolved in $CH_2Cl_2$ (25 ml) then recrystallised from ethanol (250 ml) to give pure 2,5-di-[4-(6-acryloyloxy-hexyloxy)benzoyloxy] benzaldehyde as a white crystalline material. Yield 8.5 g.
b) 2,5-Di-[4-(6-acryloxyhexyloxy)benzoyloxy]benzoic acid

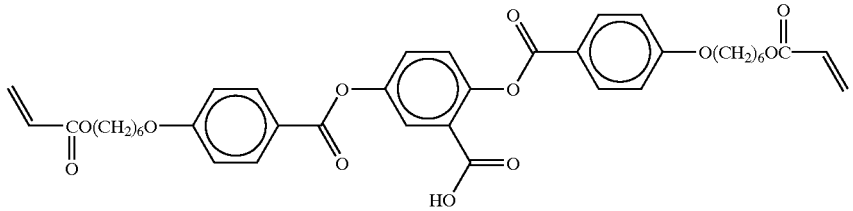

Jones oxidant ($CrO_3/H_2SO_4/H_2O$) (48 ml) was added to a ice-cooled solution of 2,5-di-[4-(6-acryloyloxyhexyloxy) benzoyloxy]benzaldehyde (8.24 g, 12 mmol) in acetone (300 ml) in a dropwise fashion over a period of 30 min. The reaction mixture was stirred overnight at room temperature. The resulting green-orange mixture was filtered off to leave a green precipitate that was washed with 600 ml of ether. The combined organic solutions were washed with water until the orange coloration disappeared (6×250 ml). The colourless organic solution obtained was washed with saturated NaCl solution (2×300 ml), dried over $MgSO_4$ and filtered. Removal of the solvent gave pure 2,5-di-[4-(6-acryloyloxyhexyloxy)benzoyloxy]benzoic acid as a white crystalline material. Yield 8.5 g.
c) Diisopropyl L-2,3-bis-{2,5-bis-[4-(6-acryloyloxyhexyloxy)benzoyloxy]benzoyl-oxy}succinate A solution of mesyl chloride (1.10 ml) in 5 ml of dry THF is dropwise added to a solution of 2',5'-bis-[2,5-di-(4-(6-acryloyloxyhexyloxy)benzoyloxy)]benzoic acid (10 g) and triethylamine (19.8 ml) in 125 ml of dry THF, cooled at −25° C. and maintained and under argon atmosphere. After complete addition (15 min), the reaction mixture is further stirred for 120 min at −25° C. then treated with a solution of diisopropyl L-tartrate (1.35 g) in 20 ml of dry THF containing 695 mg, of DMAP and the reaction mixture is further stirred at −25° C. for 2 h. The temperature is then allowed to reach room temperature and stirring is continued overnight. The reaction mixture is filtered over Celite and evaporated to dryness to afford a slightly beige pasty material. This is then flash chromatographed over a silica column affording pure diisopropyl L-2,3-bis-{2,5-bis-[4-(6-acryloyloxyhexyloxy)benzoyloxy]benzoyloxy} succinate [the "L" indicating the formal derivation of the compound from diisopropyl L-tartrate] as a transparent oily material which becomes pasty upon standing.

Yield: 5.0 g.

EXAMPLE 2

Diisopropyl D-2,3-bis-{2,5-bis-[4-(6-acryloyloxyhexyloxy)benzoyloxy]benzoyloxy-succinate

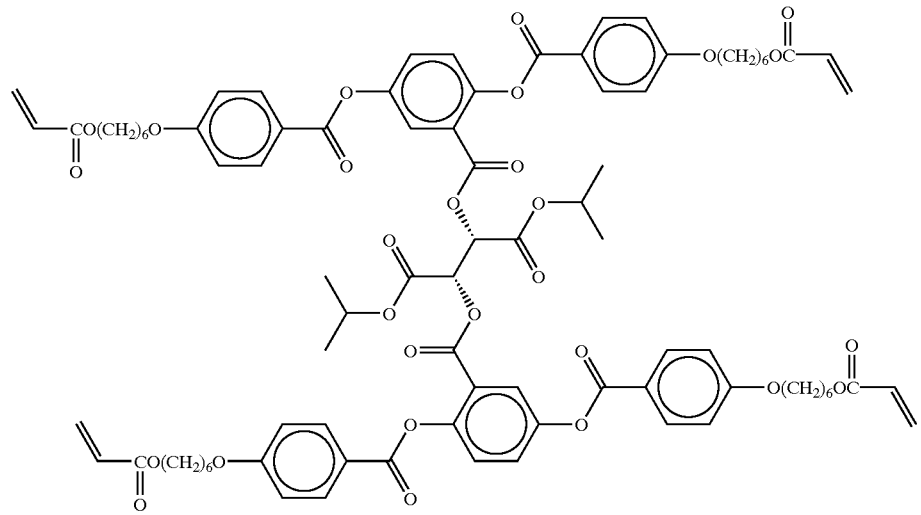

Following the procedure described in Example 1(C), the reaction was performed with 10 g of 2',5'-bis-[2,5-di-(4-(6-acryloyloxyhexyloxy)benzoyloxy)]benzoic acid, 1.10 ml of mesyl chloride, 19.8 ml of triethylamine, 1.5 g of diisopropyl L-tartrate and 695 mg of DMAP to afford, after flash chromatography over a silica column, pure diisopropyl D-2,3-bis-{2,5-bis-[4-(6-acryloyloxyhexyloxy)benzoyloxy] benzoyloxysuccinate [the "D" indicating the formal derivation of the compound from diisopropyl D-tartrate] as a transparent oily material which becomes pasty upon standing.

Yield: 6.3 g.

EXAMPLE 3

O,O-Di-{2,5-bis-[4-(6-acryloyloxyhexyloxy)benzoyloxy]benzoyl}-1,4,3,6-dianhydro-D-mannitol

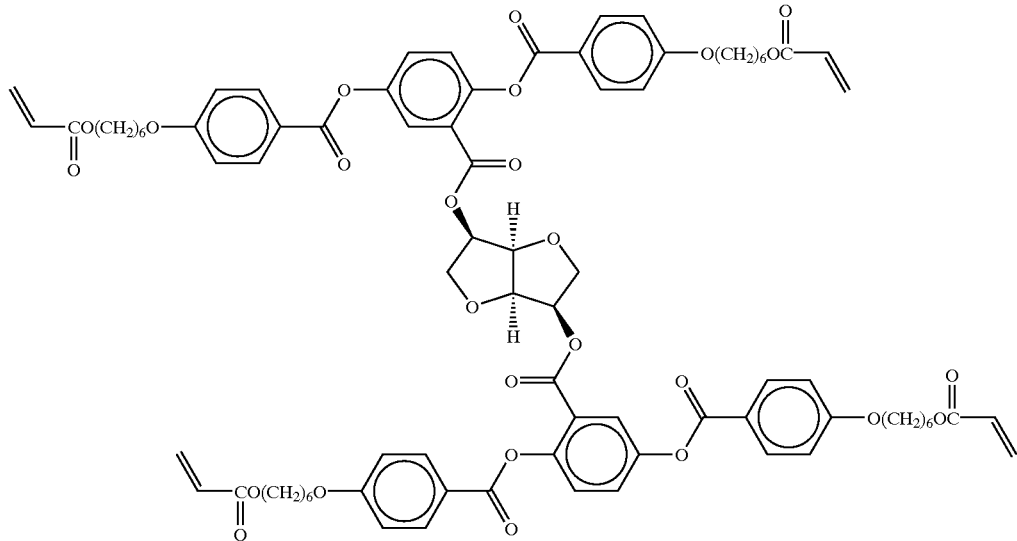

Following the procedure described in Example 1(C), the reaction was performed with 1.5 g of 2',5'-bis-[2,5-di-(4-(6-acryloyloxyhexyloxy)benzoyloxy)]benzoic acid, 0.17 ml of mesyl chloride, 3 ml of triethylamine, 0.14 g of 1,4,3,6-dianhydro-D-mannitol and 61 mg of DMAP in 50 ml of THF to afford, after flash chromatography over a silica column, pure O,O-di-{2,5-bis-[4-(6-acryloyloxyhexyloxy)benzoyloxy]benzoyl}-1,4,3,6-dianhydro-D-mannitol as white crystalline material.

Yield: 0.28 g.

EXAMPLE 4

A mixture is formulated consisting of 1% by weight of

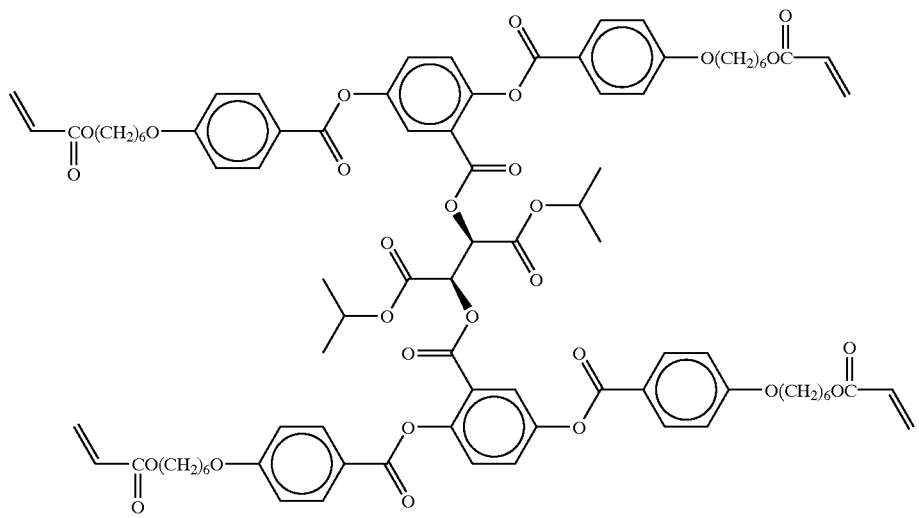

and
99% by weight of

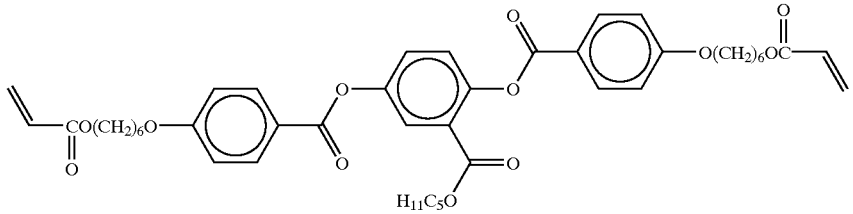

This mixture forms a cholesteric phase with a pitch of p=4 μm.

What is claimed is:

1. A compound of formula I:

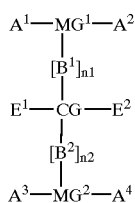  (I)

in which:

$A^1$ to $A^4$ each independently represent hydrogen; an optionally-substituted methyl group; or an optionally-substituted hydrocarbon group of 2 to 80 C-atoms, in which one or more C-atoms may be replaced by a heteroatom, in such a way that oxygen atoms are not linked to one another, selected from formula (II):

$$P\text{-}(Sp^1)_{k1}\text{-}(X^1)_{t1}\text{-} \quad (II)$$

wherein:

P is hydrogen or a polymerisable group selected from groups comprising $CH_2=CW-$, $CH_2=CW-O-$, $CH_2=CW-COO-$, $CH_2=C(Ph)-COO-$, $CH_2CH-COO-Ph-$, $CH_2CW-CO-NH-$, $CH_2=C(Ph)-CONH-$, $CH_2=C(COOR')-CH_2-COO-$, $CH_2=CH-O-$, $CH_2=CH-OOC-$, $(Ph)-CH=CH-$, $CH_3-CH=N-(CH_2)_{m3}$, $HO-$, $HS-$, $HO-(CH_2)_{m3}$, $HS-(CH_2)_{m3}$, $HO(CH_2)_{m3}COO-$, $HS(CH_2)_{m3}COO-$, $HOC(O)-$, $CH_2=CH-Ph-(O)_{m4}$

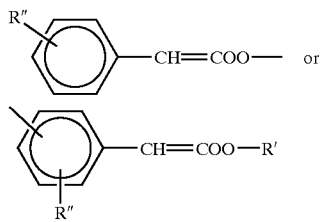

wherein:

W represents H, F, Cl, Br or I or a $C_{1-5}$ alkyl group: m3 is an integer having a value of from 1 to 9;
m4 is an integer having a value of 0 or 1,
R' represents a $C_{1-5}$ alkyl group; and
R" represents a $C_{1-5}$ alkyl group, methoxy, cyano, F, Cl, Br or I;
$Sp^1$ represents an optionally-substituted $C_{1-20}$ alkylene group, in which one or more C-atoms may be replaced by a heteroatom;
$k^1$ is an integer having a value of from 0 to 4;
$X^1$ represents $-O-$, $-S-$, $-NH-$, $N(CH_3)-$, $-CH(OH)-$, $-CO-$, $-CH_2(CO)-$, $-SO-$, $-CH_2(SO)-$, $-SO_2-$, $-CH_2(SO_2)-$, $-COO-$, $-OCO-$, $-OCO-O-$, $-S-CO-$, $-CO-S-$, $-SOO-$, $-OSO-$, $-SOS-$, $-CH_2-CH_2-$, $-OCH_2-$, $-CH_2O-$, $-CH=CH-$, or 13 $C\equiv C-$; and
$t^1$ is an integer having a value of 0 or 1:
wherein the term Ph denotes phenylene and (Ph) denotes phenyl;
$E^1$ and $E^2$ each independently represent hydrogen; an optionally-substituted methyl group; or an optionally-substituted hydrocarbon group of 2 to 80 C-atoms, in which one or more C-atoms may be replaced by a heteroatom, in such a way that oxygen atoms are not linked to one another, selected from formula (II):

$$P\text{-}(Sp^1)_{k1}(X^1)_{t1}- \quad (II)$$

$B^1$ and $B^2$ each independently represent a group of formula (IV):

$$(X^2)_{t2}\text{-}(Sp^2)_{k2}\text{-}(X^3)_{t3} \quad (IV)$$

wherein:

$Sp^2$ represents a $C_{1-20}$ alkylene group;
$X^2$ and $X^3$ each independently represent $-O-$, $-S-$, $-NH-$, $N(CH_3)-$, $-CH(OH)-$, $-CO-$, $-CH_2(CO)-$, $-SO-$, $-CH_2(SO)-$, $-SO_2-$, $-CH_2(SO_2)-$, $-COO-$, $-OCO-$, $-OCO-O-$, $-S-CO-$, $-CO-S-$, $-SOO-$, $-OSO-$, $-SOS-$, $-CH, -CH_2-$, $-OCH_2-$, $-CH_2O-$, $-CH=CH-$, $-C\equiv C-$ or a single bond;
k2 is an integer, having a value of 0 or 1; and
$t^2$ and $t^3$ are integers, each independently having a value of 0 or 1;
with the proviso that oxygen atoms are not linked one to another;
$MG^1$ and $MG^2$ each independently represent an optionally-substituted aromatic or non-aromatic carbocyclic or heterocyclic ring system, with 1 to 80 C-atoms with a mesogenic architecture;
CG is a chiral group having at least two chiral centers, derived from a sugar, from an optically active biaryl group, or from a bifunctional or polyfunctional compound comprising an optically active alcohol, glycol, or amino acid; and n1 and n2 are each independently 1 or 2, where "n1=2", or "n2=2", indicates the presence of two separate linkages via the groups $B^{1,}$ or the groups $B^{2,}$ between the groups $MG^1$ and CG, or CG and $MG^2$;

and in which further the substructures $A^1$-$MG^1$-$A^2$ and $A^3$-$MG^2$-$A^4$ are rod-like shaped organic residues and each have a longitudinal axis and are linked lateral to the said longitudinal axis to $B^1$ and $B^2$, respectively.

2. A compound as claimed claim 1 in which:

n1=n2=1.

3. A compound as claimed in claim 1, in which at least one of $A^1$ to $A^4$, $E^1$ and $E^2$ includes a polymerisable group.

4. A compound as claimed in claim 1, in which one or more of $CH_2$ groups present in the hydrocarbon chain of the optionally-substituted $C_{1-20}$ alkylene group $Sp^1$ is replaced, independently, by one or more groups selected from —O—, —S—, —NH—, N($CH_3$)—, —CH(OH)—, —CO—, —$CH_2$(CO)—, —SO—, —$CH_2$(SO)—, —$SO_2$—, —$CH_2$($SO_2$)—, —COO—, —OCO—, —OCO—O—, —S—CO—, —CO—S—, —SOO—, —OSO—, —SOS—, —C≡C—, —($CF_2$)—$_r$, —($CD_2$)$_s$— or C($W^1$)=C($W^2$)—, with the proviso that no two oxygen atoms are directly linked to each other, wherein $W^1$ and $W^2$ each represent, independently, H, H—($CH_2$)$_{q1}$— or Cl and the integers r, s and q1 each independently represent a number of between 1 and 15.

5. A compound as claimed in claim 1, in which $A^1$ to $A^4$ and $E^1$ to $E^2$ each independently represent a group of formula (III):

$P^2$-$Sp^5$-$X^4$-     (III)

wherein:

$P^2$ represents hydrogen, $CH_2$=$CW^5$— or $CH_2$=$CW^5$—(CO)$_{v2}$O—,

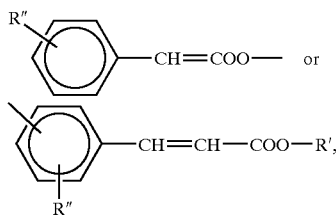

wherein:

$W^5$ represents H, $CH_3$, F, Cl, Br or I; and v2 is 0 or 1,

R' represents a $C_{1-5}$ alkyl group; and

R" represents a $C_{1-5}$ alkyl group, methoxy, cyano, F, Cl, Br or I;

$Sp^5$ represents a $C_{1-20}$ straight-chain alkylene group; and $X^4$ represents —O—, —CO—, —COO—, —OCO—, —C≡C—, or a single bond.

6. A compound as claimed in claim 1, in which $B^1$ and $B^2$ each independently represent a group of formula (IV), wherein:

$X^2$ to $X^3$ each independently represent —O—, —CO—, —COO—, —OCO—, —C≡O—, or a single bond; and $Sp^2$ represents a $C_{1-20}$ straight-chain alkylene group.

7. A compound as claimed in claim 1, in which at least one of $MG^1$ and $MG^2$ represents a mesogenic group comprising at least two optionally-substituted aromatic or non-aromatic carbocyclic or heterocyclic ring systems.

8. A compound as claimed in claim 1, in which one or more of $MG^1$ and $MG^2$ represents a mesogenic group comprising 1 to 4 aromatic or non-aromatic carbocyclic or heterocyclic ring systems and optionally up to 3 bridging groups.

9. A compound as claimed in claim 8, in which $MG^1$ and $MG^2$ are selected from the meanings of formulae (V):

$C^1$-($Z^1$-$C^2$)$_{a1}$-($Z^2$-$C^3$)$_{a2}$-($Z^3$-$C^4$)$_{a3}$     (V)

in which:

$C^1$ to $C^4$ are in each case independently optionally-substituted non-aromatic, aromatic, carbocyclic or heterocyclic groups;

$Z^1$ to $Z^3$ are independently from each other —COO—, —OCO—, —$CH_2$—$CH_2$—, —$OCH_2$—, —$CH_2$O—, —CH=CH—, —C≡C—, —CH=CH—COO—, —OCO—CH=CH— or a single bond; and a1, a2 and a3 are independently integers 0 to 3, such that a1+a2+a3≦3.

10. A compound as claimed in claim 9, in which $C^1$ to $C^4$ are selected from:

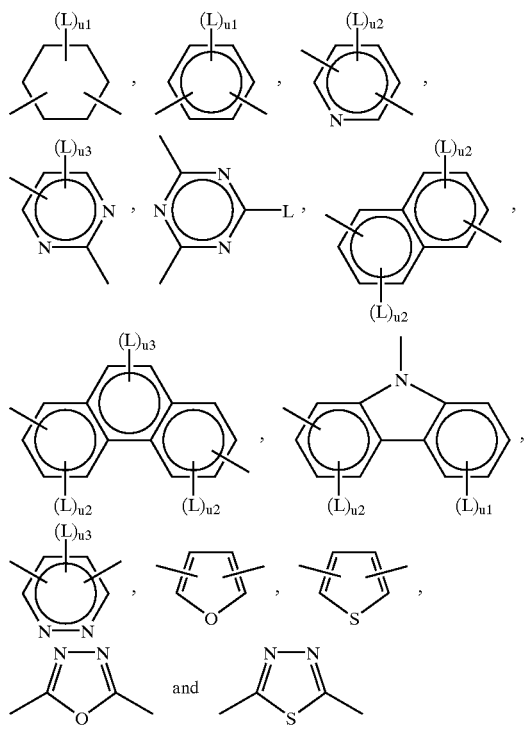

with:

L being —$CH_3$, —$COCH_3$, —$NO_2$, —CN, or halogen u1 being 0, 1, 2, 3, or 4, u2 being 0, 1, 2, or 3, and u3 being 0, 1, or 2.

11. A compound as claimed in claim 10, in which $C^1$ to $C^4$ are selected from optionally-substituted cyclohexyl or cyclohexylene, phenyl or phenylene, naphthyl or naphthylene or phenanthryl or phenanthrylene.

12. A compound as claimed in claim 1, in which $A^1$ to $A^4$ are identical.

13. A compound as claimed in claim 1, in which $E^1$ and $E^2$ are identical.

14. A compound as claimed in claim 1, in which $MG^1$ and $MG^2$ are identical.

15. A compound as claimed in claim 1, in which CG is a chiral group having at least two adjacent chiral centers.

16. A compound as claimed in claim 1, in which $B^1$ and $B^2$ are identical and both consisting of single bonds, oxygen atoms or an optionally-substituted hydrocarbon group of 1 to 3-C atoms.

17. A liquid crystalline material, in the form of a liquid crystalline mixture, (co)polymer, elastomer, polymer gel or polymer network, comprising at least two components, at least one of which is a chiral compound, characterised in that the chiral compound is a compound of formula (I) as claimed in claim 1.

18. A liquid crystalline material, in the form of a cholesteric mixture, or cholesteric polymer network, comprising at least two components, at least one of which is a chiral compound, characterised in that the chiral compound is a compound of formula (I) as claimed in claim 1.

19. A cholesteric polymer network obtainable by copolymerisation of an optically active polymerisable mesogenic mixture comprising:
   i) at least one chiral or/and achiral nematic polymerisable mixture chosen from chiral and achiral nematic materials;
   ii) at least one chiral dopant of formula (I) as claimed in claim 1;
   iii) an initiator;
   iv) optionally a non-mesogenic compound having at least one polymerisable functional group; and
   v) optionally a stabilizer.

20. A chiral polymerisable cholesteric mixture, essentially consisting of:
   i) 70 to 99% by weight of at least one achiral polymerisable liquid crystal;
   ii) 0.1 to 30% by weight of a chiral compound of formula I as claimed in claim 1
   iii) 0.1 to 5% by weight of a photoinitiator; and
   iv) 0 to 5% of a stabiliser.

21. A cholesteric film obtainable by the steps comprising ordering a chiral polymerisable cholesteric mixture as claimed in claim 20 in the monomeric state and in situ UV polymerisation of the resulting ordered mixture.

22. A compound as claimed in claim 5, wherein
   $Sp^5$ represents ethylene, propylene, butylene, pentylene, hexylene, heptylene, octylene, nonylene, decylene, undecylene, or dodecylene; and
   $X^4$ represents —O—, —COO—, —OCO— or single bond.

23. A compound as claimed in claim 6, wherein
   $X^2$ to $X^3$ each independently represent —O—, —COO—, —OCO— or a single bond; and
   $Sp^2$ represents ethylene, propylene, butylene, pentylene, hexylene, heptylene, octylene, nonylene, decylene, undecylene or dodecylene.

24. A cholesteric polymer network as claimed in claim 19, wherein the non-mesogenic compound having at least one polymerisable functional group is a diacrylate compound.

25. A method which comprises adding a compound as claimed in claim 1 as a dopant to liquid crystals or to a mixture of liquid crystals.

26. A method which comprises ordering a liquid crystalline material as claimed in claim 17 in the monomeric state and in situ UV polymerizing the ordered mixture to produce a polymeric cholesteric layer.

27. A method which comprises ordering a liquid crystalline material as claimed in claim 18 the monomeric state and in situ UV polymerizing the ordered mixture to produce a polymeric cholesteric layer.

28. An optical component comprising a cholesteric polymer network as claimed in claim 19.

29. An optical component comprising a chiral polymerizable cholesteric mixture as claimed in claim 20.

30. An optical component comprising a cholesteric film as claimed in claim 21.

* * * * *

UNITED STATES PATENT AND TRADEMARK OFFICE
CERTIFICATE OF CORRECTION

PATENT NO. : 6,905,739 B2
DATED : June 14, 2005
INVENTOR(S) : Zoubair Mohammed Cherkaoui et al.

It is certified that error appears in the above-identified patent and that said Letters Patent is hereby corrected as shown below:

Title page,
Item [57], ABSTRACT,
Line 1, "compound is of" should read -- compound of --.
Line 1, "which: $A^1$" should read -- which $A^1$ --.

Column 25,
Line 51, "$HS(CH_2)_{m3}COO-$, $HOC(O)-$," should read -- $HS(CH_2)_{m3}COO-$, $HWN-$, $HOC(O)-$, --.
Lines 58-61, " 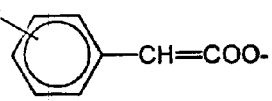 " should read -- 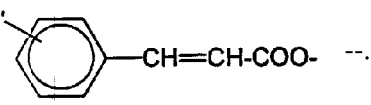 --.

Lines 62-65, " 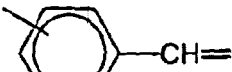 " should read

-- 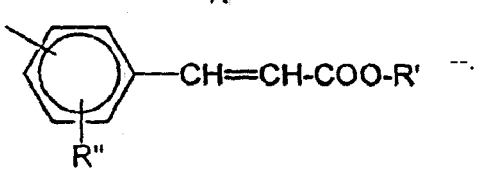 --.

Column 26,
Line 16, "group:" should read -- group; --.
Line 30, "or 13 C≡C-;" should read -- or -C≡C-; --.
Line 32, "0 or 1:" should read -- 0 or 1; --.
Line 42, "$P-(Sp^1)_{k1}(X^1)_{t1}-$     (II)" should read -- $P-(Sp^1)_{k1}(X^1)_{t1}-$     (II); --.

Column 27,
Line 12, "claimed claim" should read -- claimed in claim --.
Lines 42-45, " 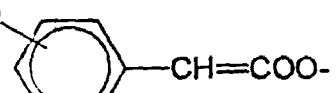 " should read -- 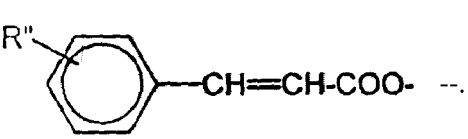 --.

UNITED STATES PATENT AND TRADEMARK OFFICE
CERTIFICATE OF CORRECTION

PATENT NO. : 6,905,739 B2
DATED : June 14, 2005
INVENTOR(S) : Zoubair Mohammed Cherkaoui et al.

It is certified that error appears in the above-identified patent and that said Letters Patent is hereby corrected as shown below:

Column 27 (cont'd),
Line 65, "-C≡O-," should read -- -C≡C-, --.

Column 28,
Line 11, "formulae" should read -- formula --.
Line 59, "3,or" should read -- 3, or --.

Column 29,
Line 40, "claim 1" should read -- claim 1; --.

Column 30,
Line 30, "claim 18 the" should read -- claim 18 in the --.

Signed and Sealed this

Sixth Day of December, 2005

JON W. DUDAS
*Director of the United States Patent and Trademark Office*